United States Patent
Fox-Rabinovitz

(10) Patent No.: US 9,922,140 B1
(45) Date of Patent: Mar. 20, 2018

(54) NAMED INTELLIGENT CONNECTORS FOR CREATING ASSEMBLIES OF COMPUTER AIDED DESIGN (CAD) OBJECTS

(71) Applicant: Bentley Systems, Incorporated, Exton, PA (US)

(72) Inventor: David L. Fox-Rabinovitz, Gaithersburg, MD (US)

(73) Assignee: Bentley Systems, Incorporated, Exton, PA (US)

(*) Notice: Subject to any disclaimer, the term of this patent is extended or adjusted under 35 U.S.C. 154(b) by 707 days.

(21) Appl. No.: 14/547,350

(22) Filed: Nov. 19, 2014

(51) Int. Cl.
*G06F 17/50* (2006.01)

(52) U.S. Cl.
CPC .................... *G06F 17/50* (2013.01)

(58) Field of Classification Search
CPC ...................................... G06F 17/50
USPC .......................................... 703/1
See application file for complete search history.

(56) References Cited

U.S. PATENT DOCUMENTS

| | | | |
|---|---|---|---|
| 6,670,961 B2 | 12/2003 | Dhimitri et al. | |
| 7,479,959 B2 | 1/2009 | Han et al. | |
| 8,400,446 B2 | 3/2013 | Gatzke et al. | |
| 8,762,110 B2 | 6/2014 | Egbertson et al. | |
| 2002/0123812 A1* | 9/2002 | Jayaram | G06T 19/20 700/98 |
| 2010/0010655 A1* | 1/2010 | Corcoran | G06F 17/50 700/98 |

OTHER PUBLICATIONS

U.S. Appl. No. 13/916,294, filed Jun. 12, 2013 by David L. Fox-Rabinovitz et al. for a Configurable Multidimensional Placement Dashboard, pp. 1-36.

* cited by examiner

*Primary Examiner* — Timothy A Mudrick
(74) *Attorney, Agent, or Firm* — Cesari & McKenna, LLP; James E. Blanchette

(57) ABSTRACT

In one embodiment, a technique is provided for creating assemblies of model objects in a modeling space of a computer aided design (CAD) application utilizing virtual connectors (i.e. "named intelligent connectors" (NICs)). Model objects may be associated with one or more NICs that represent possible points of connection to other model objects. In response to instructions in the user interface of the CAD application, a connection may be formed by recording invariant information in the NICs. Further, a connected position and orientation of a model object in a global coordinate system of the modeling space may be calculated using the invariant information in the NICs.

20 Claims, 9 Drawing Sheets

NAMED INTELLIGENT CONNECTORS FOR CREATING ASSEMBLIES OF COMPUTER AIDED DESIGN (CAD) OBJECTS

BACKGROUND

Technical Field

The present disclosure relates generally to computer-aided design (CAD), and more specifically to techniques for creating assemblies of model objects in a modeling space of a CAD application.

Background Information

To better manage the complexities of physical systems, engineers and other users often turn to CAD. Using a CAD application, a user may construct a model (e.g., a 2-D or 3-D model) of a physical system, where the model is composed of a number of individual model objects that correspond to physical components. The model objects may be arranged within a modeling space of the CAD application to represent the arrangement of the components in the physical system. For example, if the model represents a pipe network supported by support structures, then individual model objects may represent individual pipes, valves, tanks, etc., as well as struts, hangers, secondary steel, etc. Depending on the system, the physical components represented by model objects will vary.

Often with models it is desirable to group model objects into assemblies that correspond to portions of the physical system. To arrange model objects into assemblies using a typical CAD application, a user often positions and orients the model objects relative to each other within the modeling space in a manner that creates the visual impression that the model objects are joined. If the model is complex, and includes large numbers of model objects, the user may endeavor to create customized scripts to automate repetitive arrangement tasks. However, this may be difficult given the complexities of orientating and positioning model objects relative to each other using the tools provided by existing CAD applications.

The proper relative positions and orientations of model objects may be governed by a wide variety of factors, including the appearance of the model objects, properties and attributes of the model objects (which may not be presented visually in the CAD application), geometry and topology of the model objects, as well as other factors. For example, consider a model object that represents a sway strut used to support a pipe from a structural member. The proper position and orientation of the sway strut in relation to the pipe and the structural member may be affected by the position and orientation of the pipe, its dimensions, its shape, and its manner of construction (e.g., material, insulation, operational temperature, etc.); the position and orientation of the structural member, its dimensions, its shape, and its manner of construction; the intended function of the sway strut (e.g., absorbing vibrations, seismic shocks, transient forces, etc.); as well as a variety of other factors. Typically, a user would need an in-depth understanding of a variety of concepts to properly instruct the CAD application on how to position and orient the model objects relative to each other. The user may need to define a set of transformations involving explicit multiplication of 3×3 rotation matrices or 4×4 transformation matrices, as well as apply various other techniques of vector algebra. Even a skillful user may be challenged by the complexities that are exposed to them. The task may be well beyond the abilities of a novice user. As such, the functionality of many existing CAD applications is heavily dependent on the experience level of the user.

As models increase in complexity to include many thousands or even millions of model objects, the need to rapidly create assemblies of model objects is increasing. However, the complexities involved are holding back users and requiring inordinate skill on their behalf. Accordingly, there is a need for improved techniques for creating assemblies of model objects that can address some or all of these shortcomings.

SUMMARY

In one embodiment, a technique is provided for creating assemblies of model objects in a modeling space of a CAD application utilizing virtual connectors referred to herein as "named intelligent connectors" (NICs). Model objects may be associated with one or more NICs that represent possible points of connection to other model objects. In response to instructions in the user interface of the CAD application, a connection may be formed by recording invariant information in the NICs. Further, a connected position and orientation of a model object in a global coordinate system of the modeling space may be calculated using the invariant information in the NICs.

Broadly speaking, NICs may operate to form connections among model objects akin to how physical connectors form connections among physical components. For example, in a physical system consisting of a light bulb and a lamp, a user may form a physical connection using a physical connector "thread" of a component "bulb", and a physical connector "socket" of a component "lamp". The physical connector "thread" and the physical connector "socket" may dictate compatibility (e.g., a florescent tube is not physically compatible with an incandescent light bulb socket). Further, when the position and orientation of the component "lamp" is known, the position and orientation of the component "bulb" may be readily calculated based upon the position and orientation of the component "lamp" and properties dictated by the physical connectors (e.g., where the connectors are located on the component "lamp" and the component "bulb"). NICs may provide a digital equivalent of these sorts of physical interactions, providing tools within the modeling space of a CAD application which mimic a user's experiences in the physical world.

In operation, a first model object may be located at a position and orientation in a global coordinate system of the modeling space of the CAD application. The first model object may have a first NIC that is defined by a position and orientation in a local coordinate system of the first model object. A second model object may have a second NIC defined by a position and orientation in a local coordinate system of the second model object. A user may indicate in a user interface of the CAD application that the first model object is to be connected, via the first NIC, to the second NIC of the second model object. The CAD application may determine compatibility of such a connection by comparing a connector purpose parameter and a connector type parameter of the first NIC to a connector purpose parameter and a connector type parameter of the second NIC. Provided the connectors are compatible, a connection may be established between the first model object and the second model object by recording invariant information about each NIC in the other NIC. The recording invariant information may indicate the position and orientation of the second NIC in the local coordinate system of the first model object, as well as other information about the second NIC, such as a connector purpose parameter, connector type parameter, etc., within the first NIC; and indicate the position and orientation of the first NIC in the local coordinate system of the second model object, as well as other information about the first NIC such as a connector purpose parameter, connector type parameter, etc. within the second NIC. Such invariant information may be maintained despite user input in the user interface of the CAD application moving the first model object, or the second model object, in the modeling space, provided the first model object and the second model object are not explicitly disconnected.

Based on the position and orientation of the first model object in the global coordinate system, the position and orientation of the first NIC in the local coordinate system of the first model object, and the position and orientation of the second connector in the local coordinate system of the second model object, a position and orientation of the second model object in the global coordinate system of the modeling space may be calculated. This calculated position and orientation may be used to display the second model object in the modeling space in the user interface of the CAD application. Alternatively, this calculated position and orientation may be used to validate (or invalidate) the connection between the first model object and the second model, among other uses.

It should be understood that a variety of additional features and alternative embodiments may be implemented other than those discussed in this Summary. This Summary is intended simply as a brief introduction to the reader for the further description which follows, and does not indicate or imply that the examples mentioned herein cover all aspects of the disclosure, or are necessary or essential aspects of the disclosure.

BRIEF DESCRIPTION OF THE DRAWINGS

The description below refers to the accompanying drawings of example embodiments, of which.

DETAILED DESCRIPTION

Figure 1:
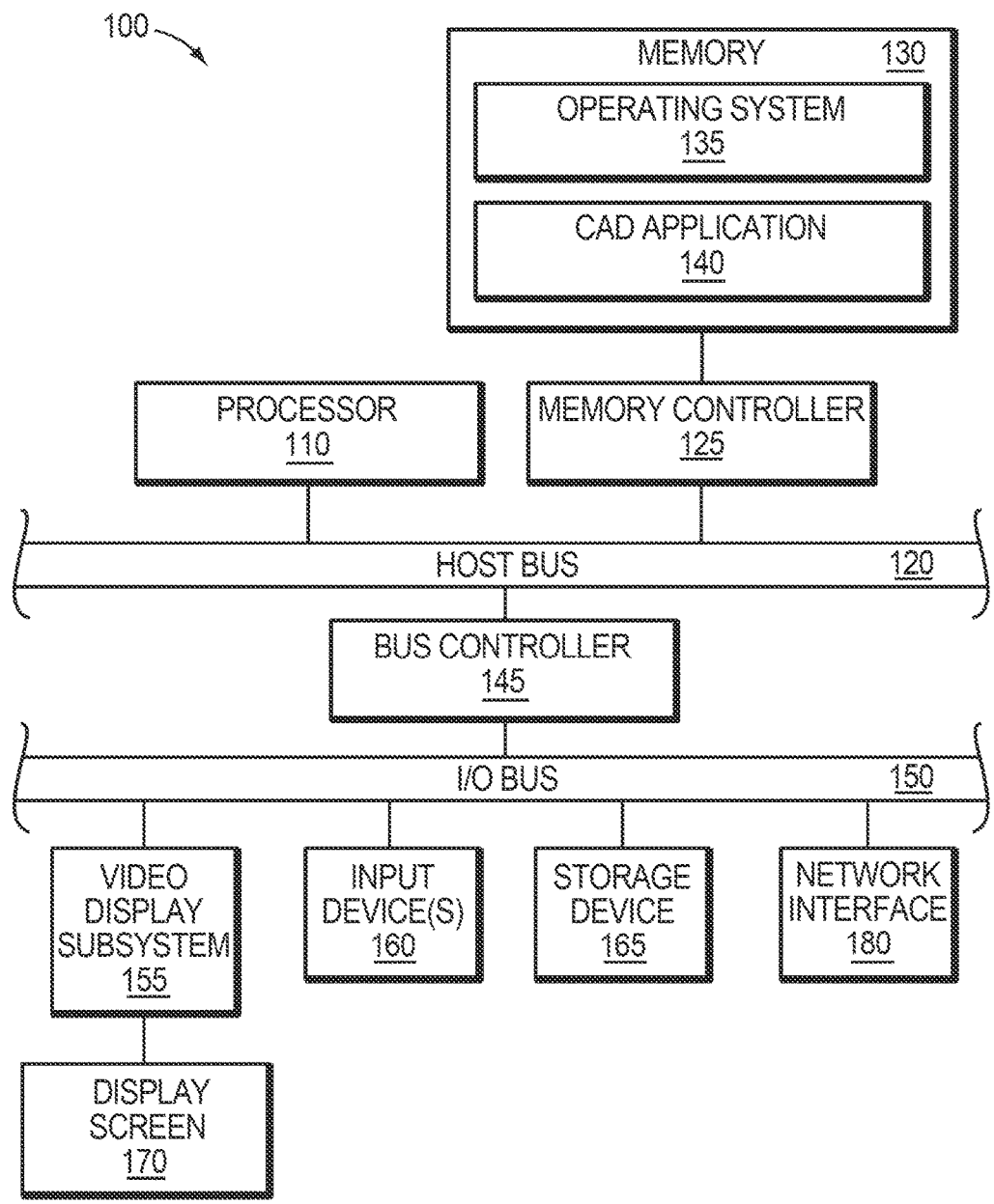
FIG. 1 is a block diagram of an example electronic device that may be used with the present techniques.

FIG. 1 is a block diagram of an example electronic device 100 that may be used with the present techniques. The electronic device 100 may be a designed for stationary operation (e.g., may be a desktop computer), or may be a portable electronic device (e.g., a notebook computer, a tablet computer, a smartphone, etc.). The electronic device 100 includes at least one processor 110 coupled to a host bus 120. The processor 110 may be any of a variety of commercially available processors, such as an Intel x86 processor, or another type of processor. A volatile memory 130, such as a Random Access Memory (RAM) is coupled to the processor is also coupled to the host bus via a memory controller 125. When in operation, the memory 120 stores processor-executable instructions and data that are provided to the processor. An input/output (I/O) bus 150 is accessible to the host bust 120 via a bus controller 145. A variety of additional components are coupled to the I/O bus 150. For example, a video display subsystem 155 is coupled to the I/O bus 150. The video display subsystem may include a display screen 170 and hardware to drive the display screen. At least one input device 160, such as a keyboard, a touch sensor, a touchpad, a mouse, etc., is also coupled to the I/O bus. A persistent storage device 165, such as a hard disk drive, a solid-state drive, or anther type of persistent data store, is further attached, and may persistently store computer-executable instructions and data, that are loaded into the volatile memory 130 when needed. Still further, a network interface 180 is coupled to the I/O bus 150. The network interface enable communication over a computer network, such as the Internet, between the electronic device 100 and other devices, using any of a number of well known networking protocols. Such communication may enable collaborative, distributed, and remote computing with functionality, including the functionality discussed below, spread across multiple electronic devices.

Working together, the components of the electronic device 100 (and other electronic devices in the case of collaborative, distributed, and remote computing) may execute a number of different software applications. For example, the memory 130 may store at least a portion of processor-executable instructions for an operating system (OS) 135 as well as for a CAD application 140. The CAD application 140 may be based upon the MicroStation® environment available from Bentley Systems Inc., or another type of modeling infrastructure provided by another vendor. The CAD application 140 may be used to create, edit, and/or view a model (e.g., a 2-D or 3-D model) of a physical system, where the model is composed of a number of individual model objects that correspond to physical components. At least some of these model objects may be organized into assemblies that correspond to portions of the physical system.

A user interface (e.g., a graphical user interface (GUI)) of the CAD application 140 may be shown on the display screen 170 of the electronic device 100. The user interface may include a number of portions, including control portions that provide interface elements for activating functions of the CAD application, and a workspace portion in which a visual representation of the model may be shown. Using an input device 160, a user may interact with the user interface of the CAD application 140. The user selections may be used to perform a wide variety of tasks within the CAD application related to creating, editing, and/or viewing a model. Among these many functions, the user selection may be used to interoperate to create assemblies of two or more model objects within the modeling space.

Figure 2A:
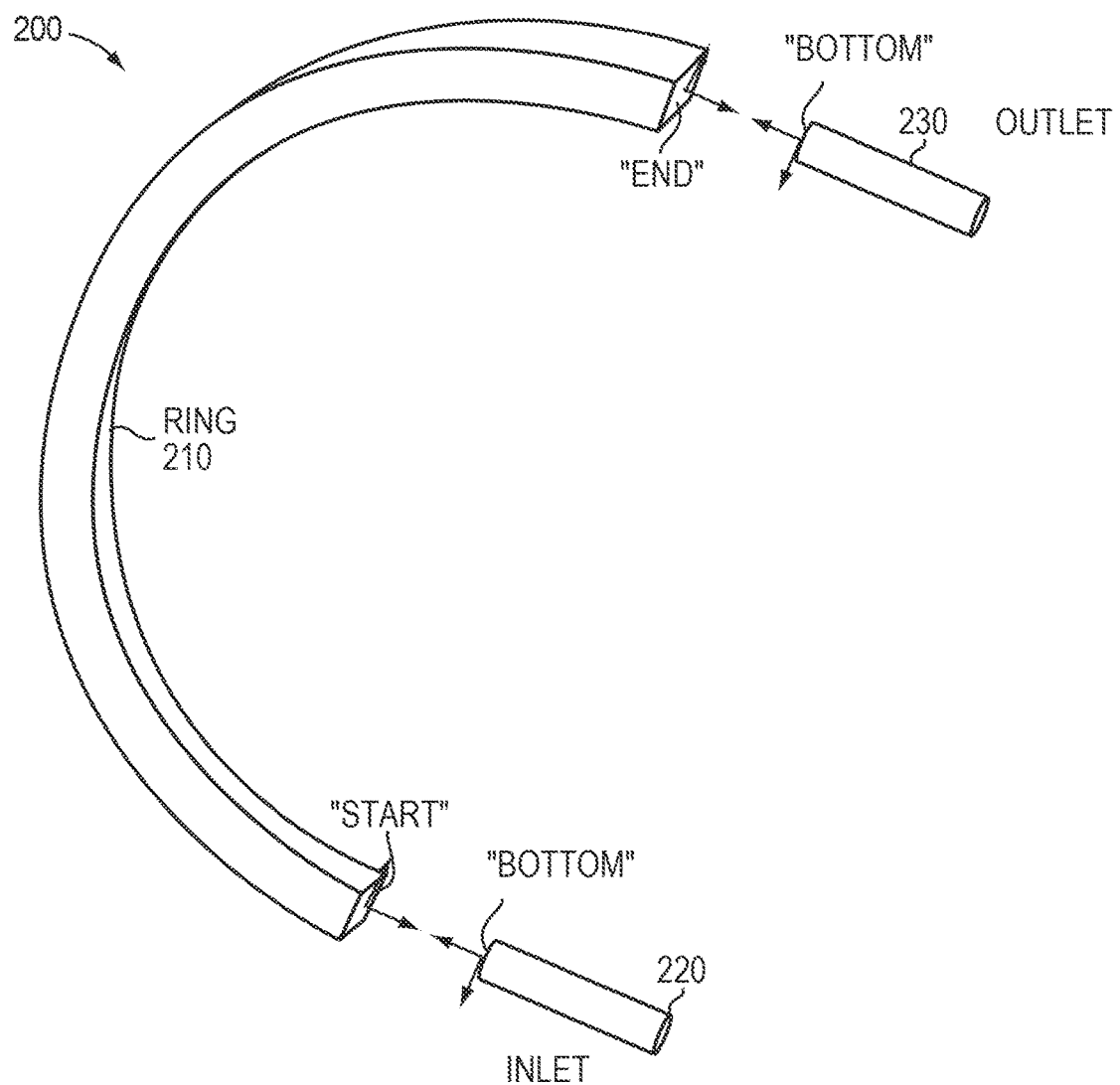
FIG. 2A is a view of an example set of model objects disposed within a modeling space of a CAD application which may be formed into an assembly.
Figure 2B:
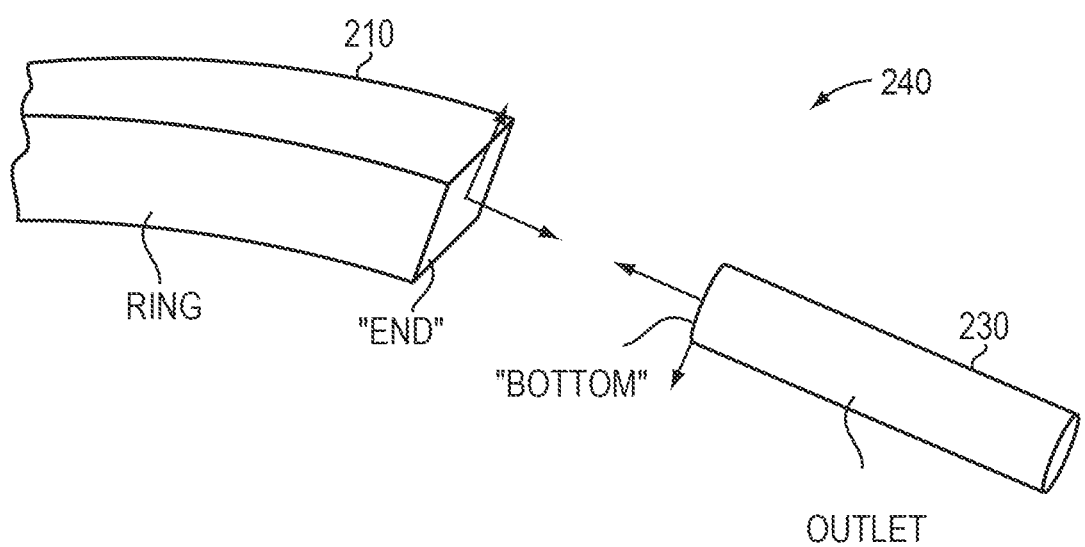
FIG. 2B is an enlarged view of a portion of a ring object showing an outlet object about to be attached.
Figure 2C:
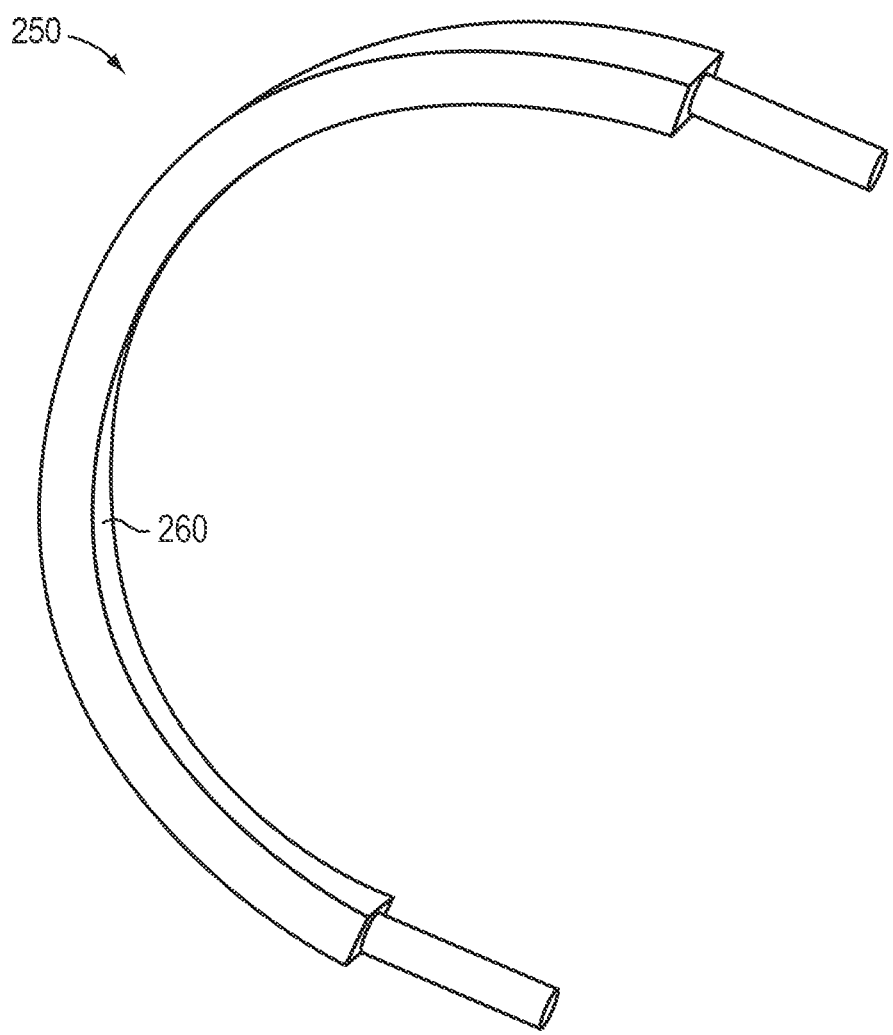
FIG. 2C is a view of an example completed assembly.

FIG. 2A is a view 200 of an example set of model object 210, 220, 230 disposed within a modeling space of a CAD application which may be formed into an assembly. The set of objects may include a ring object 210 that is arbitrarily positioned and oriented within a global coordinate system of the modeling space, as well as an inlet object 220 and an outlet object 230 that are to be attached to the ring object 210. FIG. 2B is an enlarged view 240 of a portion of the ring object 210 showing the outlet object 230 about to be attached. FIG. 2C is a view 250 of an example completed assembly 260.

Traditionally, a user desiring to specify the proper relative positions between the model objects 210-230 would need to define a set of transformations involving explicit multiplication of 3×3 rotation matrices or 4×4 transformation matrices, among other complex operation. However, the use of NICs as described herein may permit a far more intuitive definition. In the example shown in FIGS. 2A-C, the ring object 210 may include a first NIC having an associated name "start" and a second NIC having an associated name "end" Likewise, the inlet object 220 may be defined to include a NIC having an associated name "bottom", and the outlet object 230 may be defined to have a NIC having an associated name "bottom" associated with a point of potential connection. A user may specify the proper relative positions via an instruction equivalent to the text phrase "insert NIC 'bottom' of 'inlet' into NIC 'start' of 'ring' and insert NIC 'bottom' of 'outlet' into NIC 'end' of 'ring'". The instruction may take the form of user entered commands in a scripting language, selection of GUI elements, or some other form of equivalent input. Regardless of the form, however, the interaction may mimic intuitive physical manipulations the user is already familiar with in the real world, such that the user can leverage their understanding of how physical components connect together w to connect model objects together.

Figure 3:
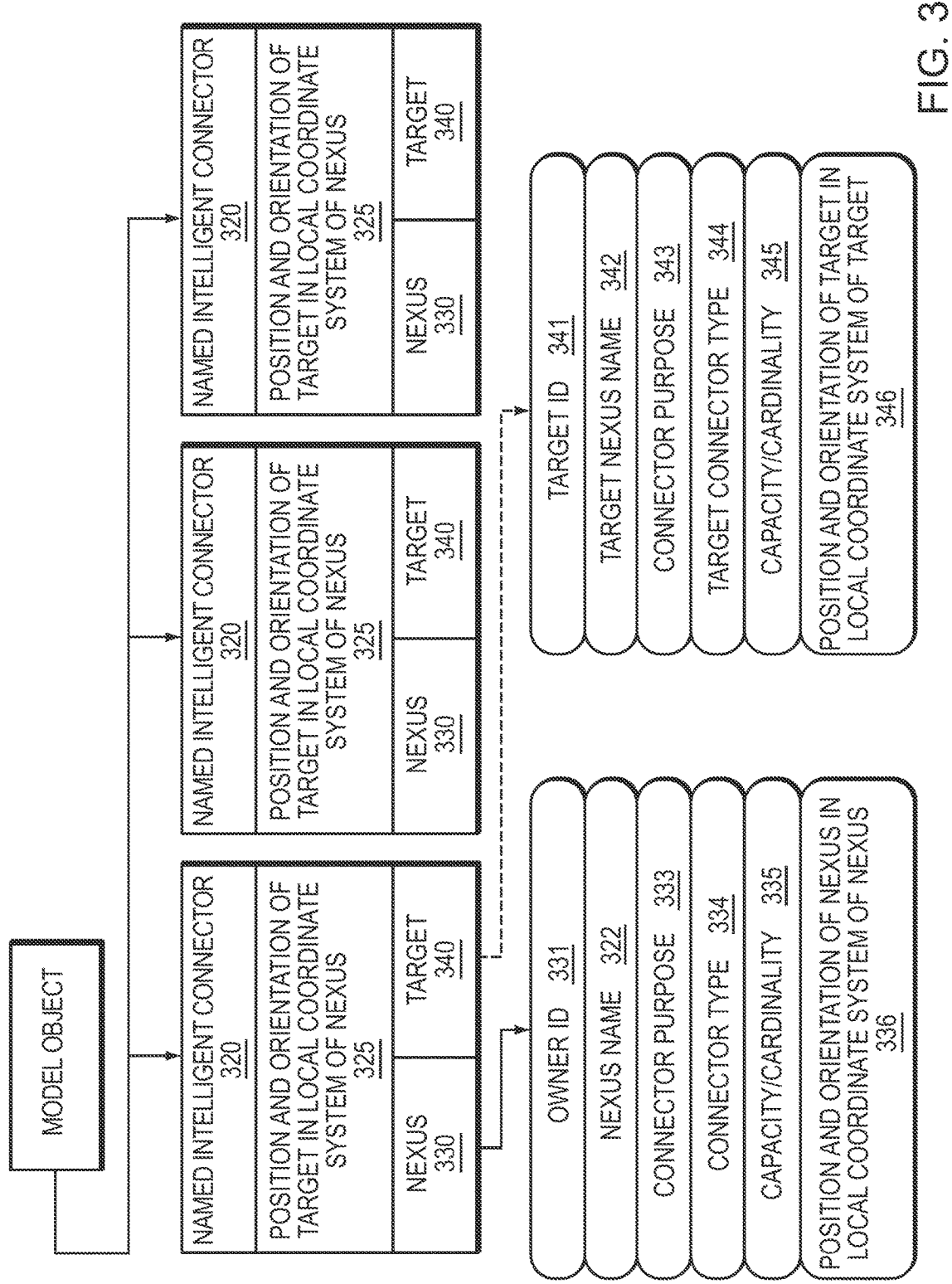
FIG. 3 is a block diagram of an example data structure for a model object that includes a plurality of NICs.

FIG. 3 is a block diagram 300 of an example data structure for a model object (referred to herein as a "first" model object 310 for purposes of distinguishing it from other model objects). The model object includes a plurality of NICs (referred to herein as "first" NICs 320 for purposes of distinguishing from NICs of other model objects). Each first NIC 320 may store a collection of information used to maintain a connection to another NIC (referred to herein as a "second" NIC to distinguish it) of another model object (referred to herein as a "second" model object to distinguish it). Using alternative terminology, it may be staid that the first NIC 320 provides a "nexus" to which a "target" may be connected. As used herein the term "nexus" refers to a point of connection provided by a NIC that is being examined, and the term "target" refers to a point of connection on an opposing NIC. Such terminology may be used in combination with, or as an alternative to, the terminology of "first" and "second" to distinguish among structures.

The information maintained in the first NIC 320 may be divided into a nexus data structure 330 and a target data structure 340. The nexus data structure 330 may store information related to the first NIC 320 that is defined at the time the first model object 310 was created, or at another time prior to a connection being formed to the second model object. The nexus data structure may include an owner identifier (ID) 331 that identifies the first model object, a nexus name 332 that identifies the first NIC 320, a connector purpose parameter 333 that describes a technical nature of the first NIC 320, a connector type parameter 334 that describes a geometry of the first NIC 320, a capacity/cardinality parameter 335 that describes a number of connections that are possible to the first NIC 320, as well as a Position and Orientation of Nexus in Local Coordinate System of Nexus descriptor 336 that describes the position and orientation of the first NIC 320 in a local coordinate system of the first model object 320.

The target data structure 340 of the first NIC 320 may store information related to a second NIC of a second model object that is connected to the first NIC. The target data structure 340 may be defined at the time the connection is established. Use of the target data structure allows the first NIC 320 to "remember" it is connected to the second NIC, as well as properties of such connection. The target data structure 340 may include a target ID 341 that identifies the second model object, a target name 342 that identifies the second NIC, a connector purpose parameter 343 that describes a technical nature the second NIC, a connector type parameter 344 that describes a geometry of the second NIC, a capacity/cardinality parameter 345 that describes a number of connections that are possible for the second NIC, as well as a Position and Orientation of Target in Local Coordinate System of Target descriptor 346 that describes a position and orientation the second NIC in a local coordinate system of the second model object.

Since the information in the nexus data structure 330 and the target data structure 340 describe a common point of connection between the first and second model objects in both a local coordinate system of the first model object and a local coordinate system of the second model object, and they may indicate the position and orientation of the second NIC in the local coordinate system of the first model object. The position and orientation of the second NIC in the local coordinate system of the first model object may be represented as a Position and Orientation of Target in Local Coordinate System of Nexus 325.

Figure 4:
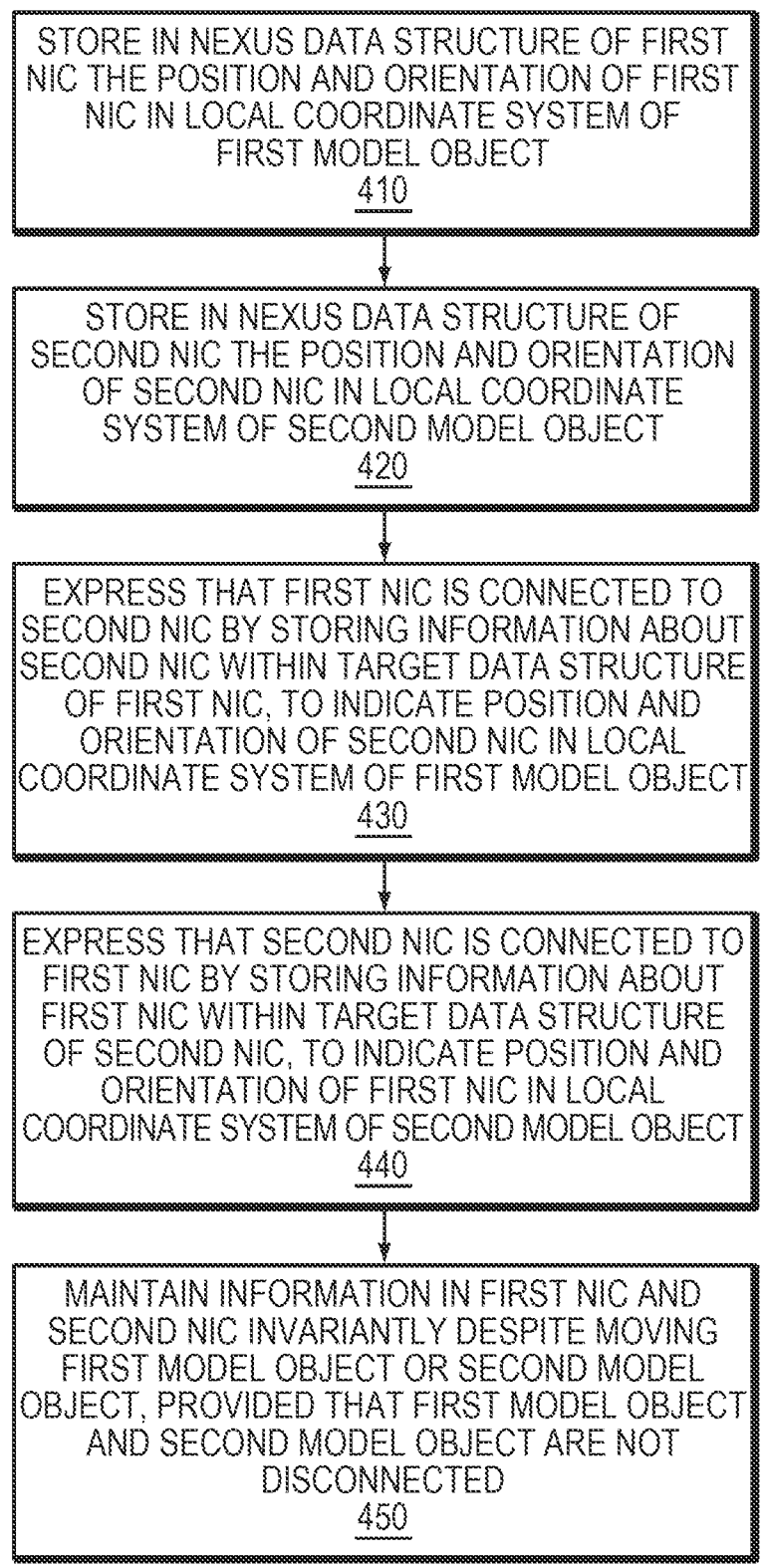
FIG. 4 is a flow diagram of an example sequence of steps for connecting a first model object having a first NIC to a second model object having a second NIC.
Figure 5:
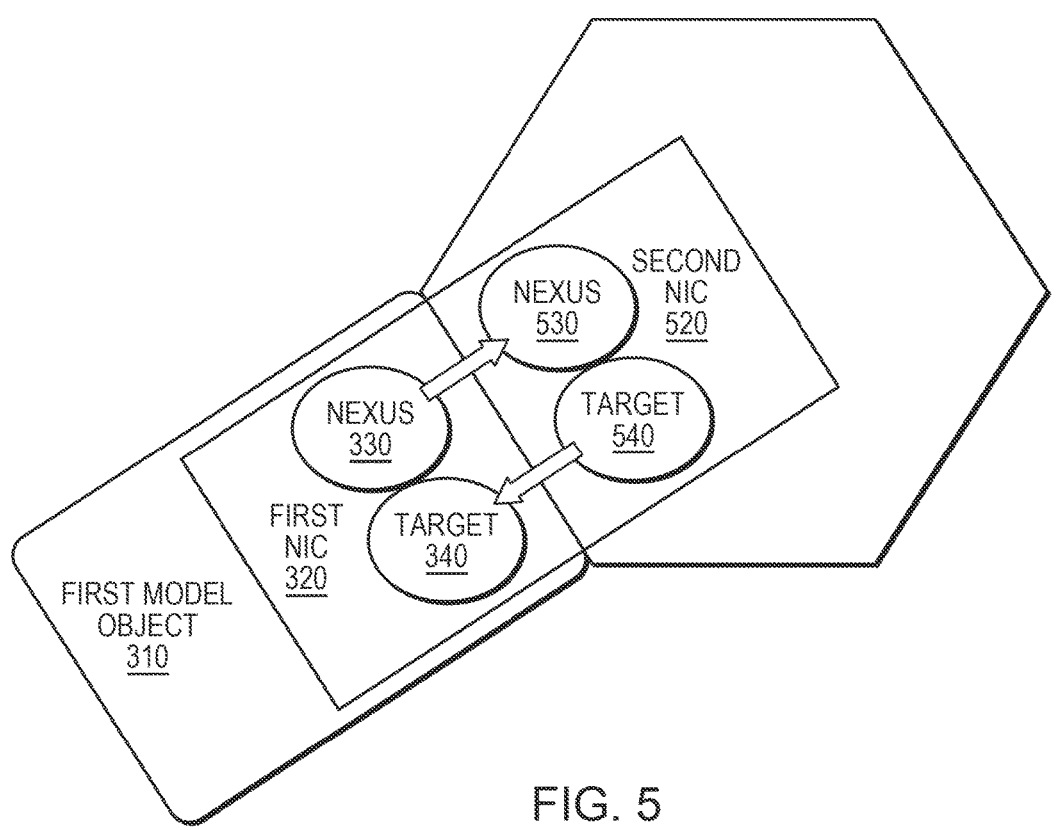
FIG. 5 is a diagram illustrating example interactions between an abstract representation of a first model object having a first NIC with a nexus data structure and a target data structure, and a second model object having a second NIC with a nexus data structure and a target data structure.

FIG. 4 is a flow diagram of an example sequence of steps 400 for connecting a first model object 310 having a first NIC 330 to a second model object having a second NIC. The steps 400 may be better understood with reference to FIG. 5, which is a diagram illustrating example interactions between an abstract representation of a first model object 310 having a first NIC 320 with a nexus data structure 330 and a target data structure 340 and a second model object 510 having a second NIC 520 with a nexus data structure 530 and a target data structure 540. The first NIC 320 of the first model object 310 may be defined by a position and an orientation in the local coordinate system of the first model object 310. At step 410, this information may be stored in the nexus data structure 320 of the first NIC 320. The second NIC 520 of the second model object 510 may be defined by a position and an orientation in a local coordinate system of the second model object 510. At step 420, this information may be stored in the nexus data structure 520 of the second NIC 320. At step 430, the fact that the first NIC 310 is connected to the second NIC 510 is expressed by storing information about the second NIC within the target data structure 340 of the first NIC. The stored information indicates the position and orientation of the second NIC 520 in the local coordinate system of the first model object 310. Further, additional information, including an ID of the second model object 510 and the name of the second NIC 520, may be stored in the target data structure 340 of the first NIC 320, for example, for use in expediting searches. At step

440, the fact that the second NIC 510 is connected to the first NIC 310 is expressed by storing information about the first NIC within the target data structure 540 of the second NIC. The stored information indicates position and orientation of the first NIC 320 in the local coordinate system of the second model object 510. Further, additional information, including an ID of the first model object 310 and the name of the first NIC 320, may be stored within the target data structure 540 of the second NIC 520. At step 450, the information in the first NIC 320 and the second NIC 520 is maintained invariantly, despite user input in a user interface of the CAD application moving the first model object 310 or the second model object 510 in the modeling space, provided that the first model object 310 and the second model object 510 are not explicitly disconnected. As such, each model object may "remember" how the other model object was positioned and oriented when the model objects were connected.

Figure 6:
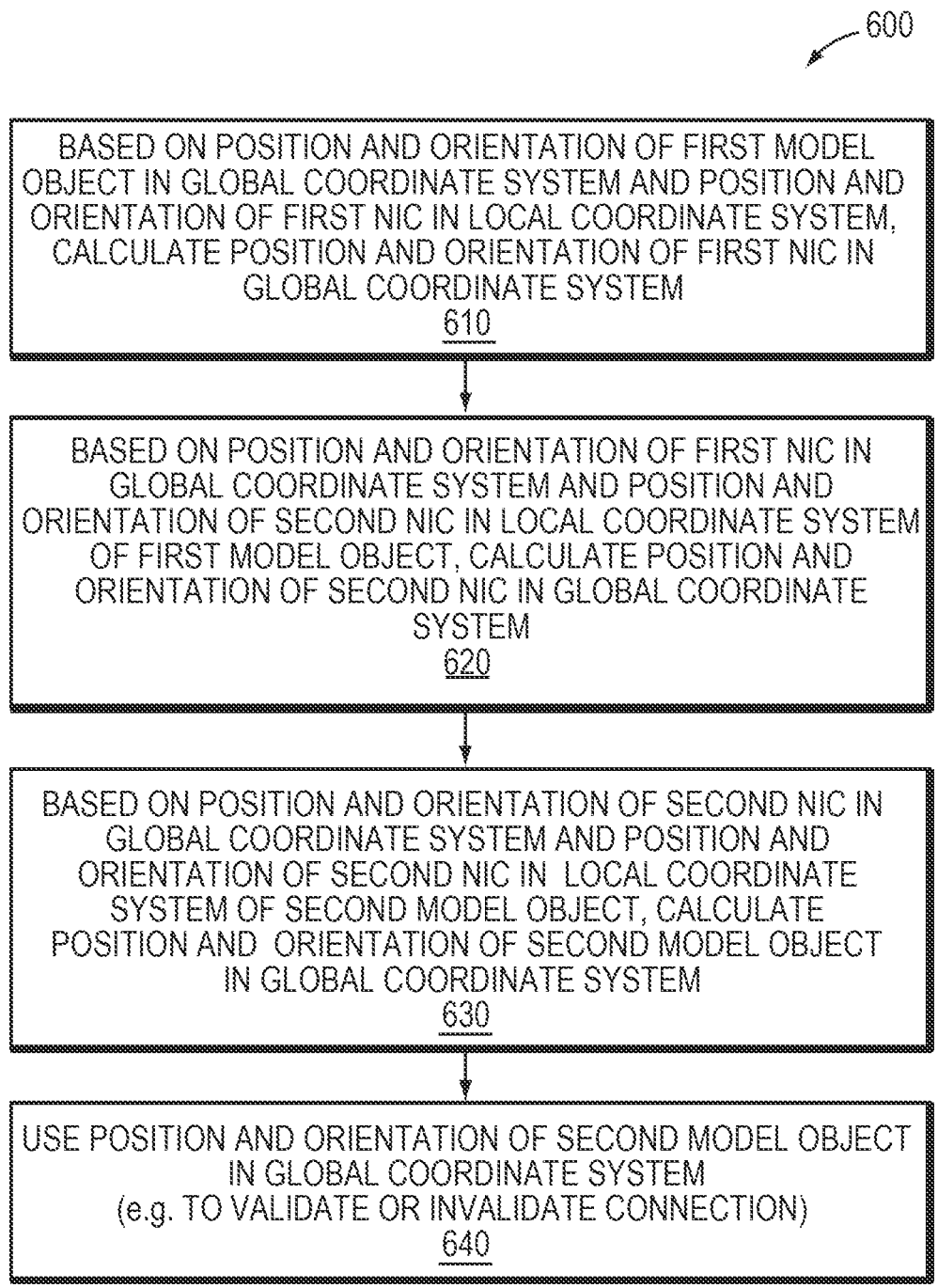
FIG. 6 is a flow diagram of an example sequence of steps for using a connection between a first model object having a first NIC and a second model object having a second NIC.

FIG. 6 is a flow diagram of an example sequence of steps 600 for using a connection between a first model object 310 having a first NIC 320 and a second model object 510 having a second NIC 520. The sequence of steps utilizes the invariant information stored in the nexus data structure 330 and the target data structure 340 of the first NIC 320. At step 610, based on the position and orientation of the first model object 310 in the global coordinate system of the modeling space and the position and orientation of the first NIC 310 in the local coordinate system of the first model object, the CAD application 140 calculates the position and orientation of the first NIC 320 in the global coordinate system. At step 620, based on the position and orientation of the first NIC 320 in the global coordinate system and the position and orientation of the second NIC 520 in the local coordinate system of the first model object 310, the CAD application 140 calculates the position and orientation of the second NIC 520 in the global coordinate system. At step 630, based on the position and orientation of the second NIC 520 in the global coordinate system and the position and orientation of the second NIC 520 in the local coordinate system of the second model object 510, the CAD application 140 calculates the position and orientation of the second model object 510 in the global coordinate system. At step 640, the position and orientation of the second model object 510 in the global coordinate system is used by the CAD application 140. For example, the position and orientation of the second model object 510 in the global coordinate system may be used to validate or invalidate the connection between the first model object 310 and the second model object 510 by comparison to an actual position and orientation of the second model object in the modeling space. Alternatively, or additionally, the position and orientation of the second model object 510 in the global coordinate system may be used to display the second model object 510 at the calculated position and orientation in the modeling space in the user interface of the CAD application 140. In still other alternatives, the position and orientation of the second model object 510 in the global coordinate system may be used for other purposes.

Figure 7:
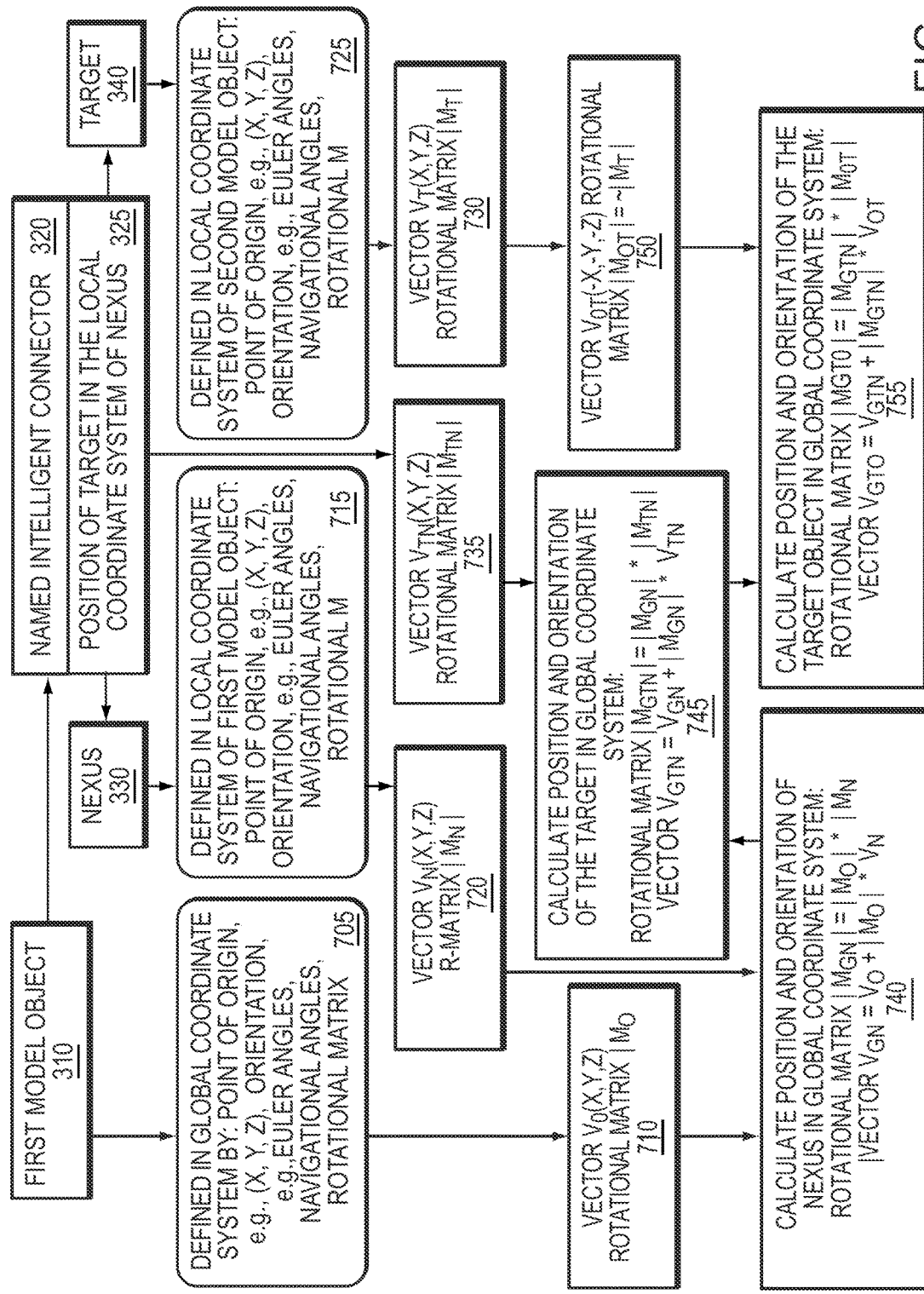
FIG. 7 is a diagram providing details of example vectors and rotation matrices that may be utilized as part of steps of FIG. 6 to determine the position and orientation of the second model object in a global coordinate system of a modeling space.

FIG. 7 is a diagram providing details of vectors and rotation matrices that may be utilized by the CAD application 140 as part of steps 610-630 of FIG. 6 to determine the position and orientation of the second model object 510 in the global coordinate system of the modeling space. As shown in box 705, the position and orientation of the first model object 310 in the global coordinate system may be defined by a point of origin (e.g., X,Y,Z coordinates) and a rotation (e.g., Euler angles, navigational, directional cosines, etc.). As shown in box 710, this quantity may be represented as an Object Vector $V_O$ (X,Y,Z) and an Object Rotation Matrix $|M_O|$. As shown in box 715, the position and orientation of the first NIC 320 in the local coordinate system of the first model object 310 may be defined as a point of origin and a rotation, as well. As shown in box 720, this quantity may represented as a Nexus Vector $V_N$ (X,Y,Z) and a Nexus Rotation Matrix $|M_N|$. Similarly, as shown in box 725, the position and orientation of the second NIC 520 in the local coordinate system of the second model object 510 may be defined as a point of origin and a rotation. As shown in box 730, this quantity may be represented as a Target Vector $V_T$ (X,Y,Z) and a Target Rotation Matrix $|M_T|$.

Since the position and orientation of the first NIC 320 in the local coordinate system of the first model object 310 and the position and orientation of the second NIC 520 in the local coordinate system of the second model object 510 were captured simultaneously, the position and orientation of the second NIC 520 in the local coordinate system of the first model object may be represented as a Target in the Local Coordinate System of the Nexus vector $V_{TN}$ (X,Y,Z) and a Target in the Local Coordinate System of the Nexus Rotation Matrix $|M_{TN}|$, at step 735.

At box 740, the position and orientation of the first NIC 320 in the global coordinate system may be calculated based on the position and orientation of the first model object 310 in the global coordinate system of the modeling space and the position and orientation of the first NIC 320 in the local coordinate system of the first model object 310. The position and orientation of the first NIC 320 in the global coordinate system may be represented as a Global Coordinate System Nexus Vector $V_{GN}=V_O+|M_O|*V_N$ and a Global Coordinate System Nexus Rotation Matrix $|M_{GN}|=|M_O|*|M_N|$.

At box 745, the position and orientation of the second NIC 520 in the global coordinate system may be calculated based on the position and orientation of the first NIC 320 in the global coordinate system and the position and orientation of the second NIC 520 in the local coordinate system of the first model object 310. The position and orientation of the second NIC 520 in the global coordinate system may be represented as a Global Coordinate System of the Target Vector $V_{GTN}=V_{GN}+|M_{GN}|*V_{TN}$ and a Global Coordinate System of the Target Rotation Matrix $|M_{GTN}|=|M_{GN}|*|M_{TN}|$.

At box 755, the position and orientation of the second model object 510 in the global coordinate system may be calculated based on the position and orientation of the second NIC 520 in the global coordinate system and the position of the second NIC 520 in the local coordinate system of the second model object 510. As an interim step, the position and orientation of the second model object may be indicated in a local coordinate system of the second NIC 520 represented as an Object in the Local Coordinate System of the Target Vector $V_{OT}$ (-X,-Y,-Z) and an Object in the Local Coordinate System of the Target Rotation Matrix $|M_{OT}|=\sim|M_T|$. Then, the position and orientation of the second model object 510 in the global coordinate system may be represented as a Global Coordinate System Target Object Vector $V_{GTO}=V_{GTN}+|M_{GTN}|*V_{OT}$ and a Global Coordinate System Target Object rotation matrix $|M_{GTO}|=|M_{GTN}|*|M_{OT}|$. After this, the operations may conclude.

In summary, the above description details techniques for efficiently creating assemblies of model objects using NICs, and then utilizing these NICs for various purposes. It should be understood that various adaptations and modifications may be readily made to the techniques, to suit various implementations. Further, it should be understood that at least some of the techniques may be implemented in software, in hardware, or a combination thereof. A software implementation may include computer-executable instructions stored in a non-transitory computer-readable medium, such as a volatile or persistent memory, a hard-disk, a compact disk (CD), or other storage medium. A hardware implementation may include specially configured processors, logic circuits, application specific integrated circuits, and/or other types of hardware components. Further, a combined software/hardware implementation may include both computer-executable instructions stored in a non-transitory computer-readable medium, as well as one or more hardware components, for example, processors. Accordingly, it should be understood that the above descriptions are meant to be taken only by way of example.

What is claimed is:

1. A method of creating assemblies of computer aided design (CAD) objects with a CAD application executing on an electronic device, comprising:
    providing a first model object in a modeling space of the CAD application, the first model object having a first connector, the first connector defined by a position and orientation in a local coordinate system of the first model object;
    providing a second model object in the modeling space of the CAD application, the second model object having a second connector defined by a position and orientation in a local coordinate system of the second model object;
    receiving an instruction in the user interface of the CAD application that the first model object is to be connected via the first connector to the second connector to the second model object; and
    establishing a connection between the first model object and the second model object by recording invariant information about each connector, the invariant information to indicate the position and orientation of the second connector in the local coordinate system of the first model object within the first connector, and to indicate the position and orientation of the first connector in the local coordinate system of the second model object within the second connector.

2. The method of claim 1, further comprising:
    based on a position and orientation of the first model object in a global coordinate system of the modeling space, the position and orientation of the first connector in a local coordinate system of the first model object, and the position and orientation of the second connector in the local coordinate system of the second model object, calculating a position and orientation of the second model object in the global coordinate system of the modeling space.

3. The method of claim 2, further comprising:
    displaying the second model object at the calculated position and orientation in the modeling space in the user interface of the CAD application.

4. The method of claim 2, further comprising:
    comparing the calculated position and orientation in the modeling space with an actual position and orientation of the second model object in the modeling space; and
    in response to the comparing, validating the connection between the first model object and the second model object and displaying a result of the validating in the user interface of the CAD application.

5. The method of claim 2, wherein the calculating further comprises:
    based the position and orientation of the first model object, calculating a position and orientation of the first connector in the global coordinate system;
    based on the position and orientation of the first connector in the global coordinate system and a position and orientation of the second connector in the local coordinate system of the first model object, calculating a position and orientation of the second connector in the global coordinate system; and
    based on the position and orientation of the second connector in the global coordinate system and the position and orientation of the second connector in the coordinate system of the second model object, calculating the position and orientation of the second model object in the global coordinate system.

6. The method of claim 1, wherein the providing the first model object further comprises storing the position and orientation of the first connector in the local coordinate system of the first model object in a nexus data structure of the first connector, the providing the second model object further comprises storing the position and orientation of the second connector in the local coordinate system of the second model object in a nexus data structure of the second connector, and the recording invariant information further comprises storing the position and orientation of the first connector in the coordinate system of the first model object in a target data structure of the second connector, and storing the position and orientation of the second connector in the coordinate system of the second model object in a target data structure of the first connector.

7. The method of claim 6, wherein the providing the first model object further comprises storing a name of the first connector in the nexus data structure of the first connector, the providing the second model object further comprises storing a name in the nexus data structure of the second connector, and the recording invariant information further comprises storing the name of the first connector in the target data structure of the second connector, and storing the name of the second connector in the target data structure of the first connector.

8. The method of claim 1, further comprising:
    maintaining the invariant information despite user input in a user interface of the CAD application moving the first model object or the second model object in the modeling space, provided the first model object and the second model object are not explicitly disconnected.

9. The method of claim 1, wherein the first connector has a connector purpose parameter that describes a technical nature of the first connector, and the method further comprises:
    verifying that the connector purpose parameter is compatible with a connector purpose parameter of the second connector that describes a technical nature of the second connector.

10. The method of claim 1, wherein the first connector has a connector type parameter that describes a geometry of the first connector, and the method further comprises:
    verifying that the connector type parameter is compatible with a connector type parameter of the second connector that describes a geometry of the second connector.

11. An electronic device comprising:
    a display screen;
    a processor configured to execute executable instructions; and
    a memory configured to store executable instructions for a computer aided design (CAD) application that when executed by the processor are operable to:

display a first model object in a modeling space of the CAD application shown on the display screen, the first model object having a first connector, the first connector defined by a position and orientation in a local coordinate system of the first model object, display a second model object in the modeling space of the CAD application shown on the display screen, the second model object having a second connector defined by a position and orientation in a local coordinate system of the second model object, and in response to an instruction from a user that the first model object is to be connected via the first connector to the second connector to the second model object, establish a connection between the first model object and the second model object by recording invariant information about each connector, the invariant information to indicate the position and orientation of the second connector in the local coordinate system of the first model object within the first connector, and to indicate the position and orientation of the first connector in the local coordinate system of the second model object within the second connector.

12. The electronic device of claim 11, wherein the executable instructions for the CAD application when executed by the processor are further operable to:

based on a position and orientation of the first model object in a global coordinate system of the modeling space, the position and orientation of the first connector in a local coordinate system of the first model object, and the position and orientation of the second connector in the local coordinate system of the second model object, calculate a position and orientation of the second model object in the global coordinate system of the modeling space.

13. The electronic device of claim 12, wherein the executable instructions for the CAD application when executed by the processor are further operable to:

display the second model object at the calculated position and orientation and in the modeling space of the CAD application shown on the display screen.

14. The electronic device of claim 12, wherein the executable instructions for the CAD application when executed by the processor are further operable to:

compare the calculated position and orientation in the modeling space with an actual position and orientation of the second model object in the modeling space, and in response to the comparison, validate the connection between the first model object and the second model and display a result of the validation in a user interface of the CAD application shown on the display screen.

15. The electronic device of claim 12, wherein the executable instructions for the CAD application when executed by the processor are further operable to:

based the position and orientation of the first model object, calculate a position and orientation of the first connector in the global coordinate system, based on the position and orientation of the first connector in the global coordinate system and a position and orientation of the second connector in the local coordinate system of the first model object, calculate a position and orientation of the second connector in the global coordinate system, and based on the position and orientation of the second connector in the global coordinate system and the position and orientation of the second connector in the coordinate system of the second model object, calculate the position and orientation of the second model object in the global coordinate system.

16. The electronic device of claim 11, wherein the executable instructions for the CAD application when executed by the processor are further operable to:

store the position and orientation of the first connector in the local coordinate system of the first model object in a nexus data structure of the first connector, store the position and orientation of the second connector in the local coordinate system of the second model object in a nexus data structure of the second connector, store the position and orientation of the first connector in the coordinate system of the first model object in a target data structure of the second connector, and store the position and orientation of the second connector in the coordinate system of the second model object in a target data structure of the first connector.

17. The electronic device of claim 15, wherein the executable instructions for the CAD application when executed by the processor are further operable to:

store a name of the first connector in the nexus data structure of the first connector, store a name in the nexus data structure of the second connector, store the name of the first connector in the target data structure of the second connector, and store the name of the second connector in the target data structure of the first connector.

18. The electronic device of claim 11, wherein the executable instructions for the CAD application when executed by the processor are further operable to:

maintain the invariant information despite movement of the first model object or the second model object in the modeling space, provided the first model object and the second model object are not explicitly disconnected.

19. A non-transitory computer-readable medium storing executable instructions that when executed on one or more processors are operable to:

display a first model object in a modeling space of a computer aided design (CAD) application, the first model object having a first connector defined by a position and orientation in a local coordinate system of the first model object;

display a second model object in the modeling space of the CAD application, the second model object having a second connector defined by a position and orientation in a local coordinate system of the second model object;

in response to an instruction from a user that the first model object is to be connected via the first connector to the second connector to the second model object, establish a connection between the first model object and the second model object by recording invariant information about each connector, the invariant information to indicate the position and orientation of the second connector in the local coordinate system of the first model object within the first connector, and to indicate the position and orientation of the first connector in the local coordinate system of the second model object within the second connector;

based on a position and orientation of the first model object in a global coordinate system of the modeling space, the position and orientation of the first connector in a local coordinate system of the first model object, and the position and orientation of the second connector in the local coordinate system of the second model object, calculate a position and orientation of the second model object in the global coordinate system of the modeling space; and use the position and orientation of the second model object in the global coordinate system to perform an operating in the CAD application.

20. The non-transitory computer-readable medium of claim 19, wherein operation is to validate or invalidate the connection between the first model object and the second model object.

* * * * *